Patented June 4, 1929.

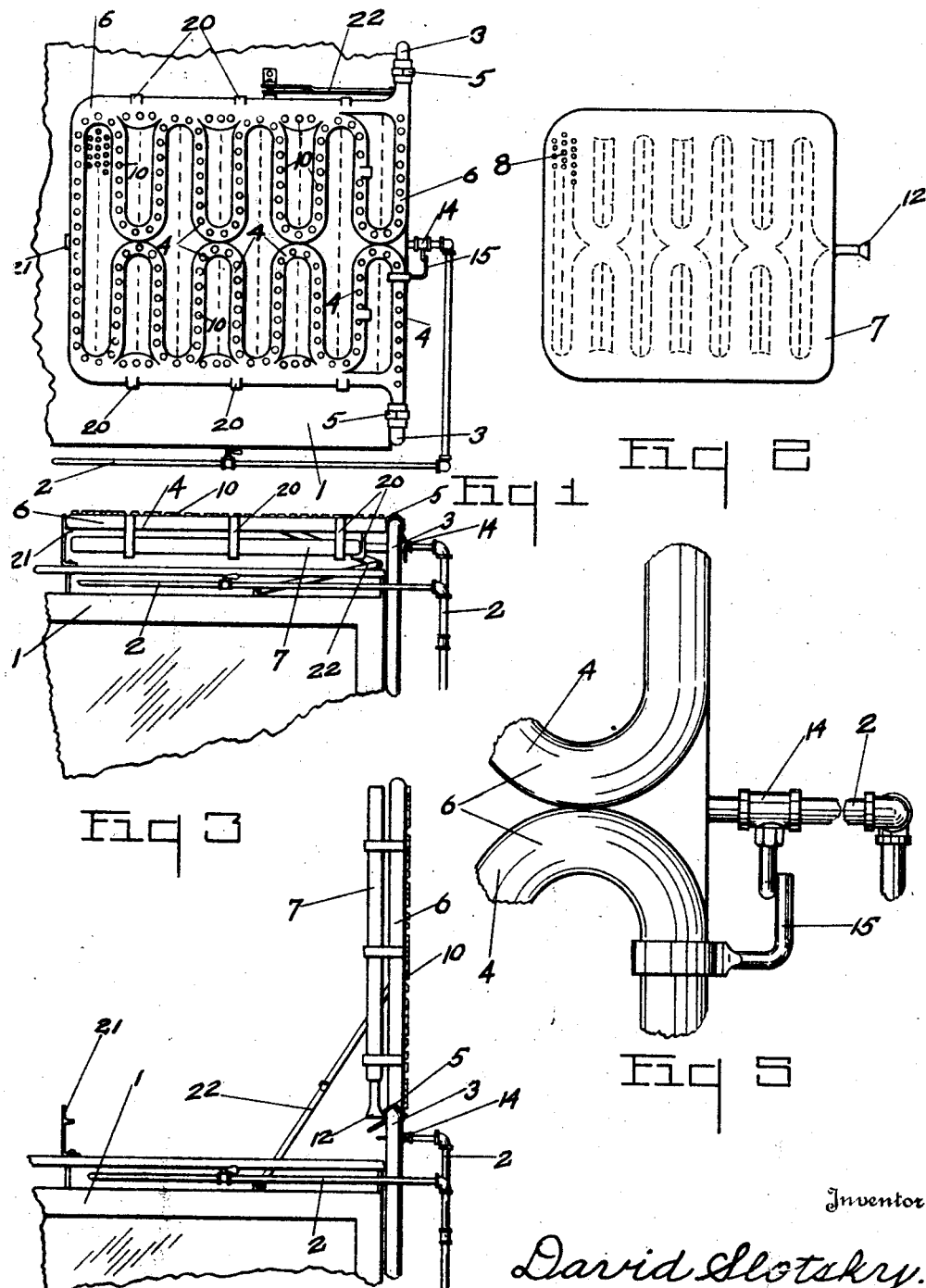

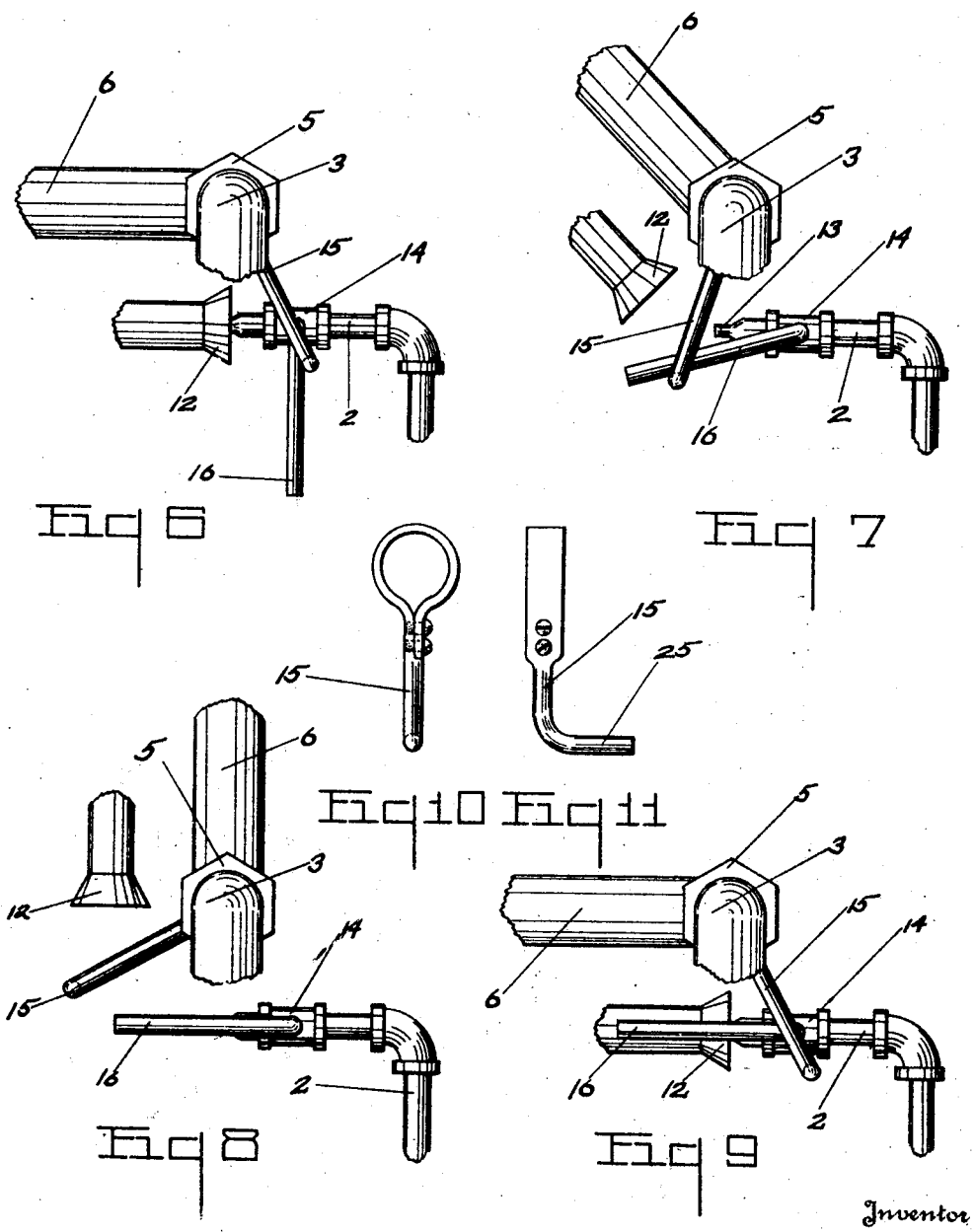

1,715,956

UNITED STATES PATENT OFFICE.

DAVID SLOTSKY, OF CLEVELAND, OHIO.

WATER HEATER.

Application filed October 21, 1927. Serial No. 227,660.

My invention has for its object to provide an efficient water heater that may be used not only for heating water but also for cooking; and is so constructed that it may be readily moved into position for efficient operation or placed so that it will occupy a small floor space.

The heater is provided with a special burner which is so constructed as to extend over a considerable area and, consequently, provides a means for heating or cooking uniformly throughout the area of a large pan. The burner is supported by the water pipes wherein the water is heated and, consequently, the burner may perform the double function of not only heating a pan that covers a large area, but also of heating the water contained in the water pipes. Means is provided for hingedly supporting the water heater in substantially a horizontal position, whereby it may be raised and lowered. In order to prevent fire or the flow of gas during the time that the water heater is in an upright position, an automatic means is provided for cutting off the gas from the heater when the heater is raised to an upright position. This provides a safety means for the protection of the user of the heater. The automatic cut-off is also formed so that upon the return of the heater to a horizontal position, the gas will not be turned on until the cut-off is manually operated.

The invention may be contained in structures of different forms and, to illustrate a practical application of the invention, I have selected a structure having a heater supported over the end of a stove, and shall describe it hereinafter. The structure selected as an embodiment of my invention is shown in the accompanying drawings.

Fig. 1 is a top view of the heater showing it located in position on the stove. Fig. 2 illustrates a top view of the heater burner removed from the heater. Fig. 3 illustrates a side view of the heater located in position on the stove. Fig. 4 illustrates a side view of the heater when it is raised upright and away from the stove. Fig. 5 illustrates a plan view of the automatic gas valve, parts of the heater being shown enlarged as compared to the illustrations of the heater shown in Figs. 1, 3, and 4. Fig. 6 is a side view and illustrates the relative position of the parts of the gas valve when the heater is located in an operative position over the stove. Fig. 7 is a side view and illustrates the relative position of the parts of the gas valve when the heater is being raised from the stove. Fig. 8 is a side view and illustrates the relative position of the parts of the gas valve when the heater is placed in its extreme position away from the stove. Fig. 9 is a side view and illustrates the relative position of the parts of the gas valve when the heater has been returned to an operative position and before the gas valve has been manually opened. Fig. 10 illustrates a finger for operating the gas valve. Fig. 11 is another view of the finger shown in Fig. 10.

The heater is supported so as to extend over the top of the stove 1 which has any number of burners. The heater may be located so as to cover certain burners of the stove 1 or a special part of the stove 1 may be provided for the heater. The water heater is hingedly supported on water pipes 3 which are connected to a suitable reservoir in a manner well known in the art. A grid 6 in which the water is heated has a sinuous passage-way formed in the sinuous parts 4 of the grid 6, and thus communication is established between the pipes 3 through the sinuous parts 4 of the grid 6. The pipes 3 are connected to the grid 6 by suitable unions 5 that permit swinging movements of the grid 6. A pipe 2 supplies gas to the stove and to a burner 7 which forms a part of the water heater. The burner 7 is provided with a plurality of openings 8 for gas, which are so located as to be beneath the spaces formed between the sinuous parts 4 of the grid when the burner is in operation. When gas passes through the burner and is ignited at the openings 8, a plurality of small flames extend upward between the parts 4 of the grid 6 and thus there is formed a large heating area of substantially uniform heat. The top of the grid 6 is provided with a plurality of small projections 10 whereby a kettle, pot or pan will be supported at a slight distance from the grid 6 and will give opportunity for the heat of the small flames to rise and pass in contact with the bottom of a large pan that may be placed upon the grid and thus such a pan will be directly and quickly heated by the flames, while at the same time, the water within the parts 4 of the grid 6 will also be heated.

The burner 7 is provided with the usual mixer 12 into which the small tubular end 13 of the gas pipe 2 normally projects in order to cause a rapid inward movement of the gas which draws the air through the mixer, the gas and air being mixed inside of the walls of the burner 7. The gas flow is controlled by a valve 14 and a finger 15 is connected to the grid 6 and is so located, with reference to an operating arm 16 of the gas valve 14, that, when the grid 6 is raised, the finger 15 will operate upon the arm 16 to close the gas valve 14. Inasmuch as it is desirable to raise the burner 7 at the same time that the grid 6 is raised, the burner 7 is supported by the brackets 20 that are connected to the grid 6 and extend beneath the burner 7. Also, in order to support the grid 6 with the burner 7 in a horizontal position, the stove 1 is provided with a bracket 21 that engages the end of the grid 6. In order to support the burner 7 and grid 6, in their upright positions when they are raised from the stove, a pair of links 22 are interconnected and interconnect the top of the stove 1 and the grid 6 to prevent further movement of the heater away from the stove, preferably, when it has been moved to a point such that the center of gravity of the burner 7 and grid 6 will be located outside of the vertical plane extending through the centers of the unions 5.

When the burner 7 and grid 6 are raised, the finger 15, which has a projecting part 25 that extends towards the arm 16, engages the arm 16 and swings the arm 16 so as to close the gas valve 14. Further upward movement causes the projecting portion 25 of the finger 15 to pass the end of the arm 16 leaving the arm 16 in a substantially horizontal position and the valve 14 closed. On the return movement of the grid 6 and burner 7 to the top of the stove, the projecting part 25 of the finger 15 passes beneath the arm 16 without actuating it. When they are placed in this position, the nozzle 13 of the pipe 2, enters the mixer 12 and the mixer is again in position to receive gas from the pipe 2. When, therefore, it is desired to light the burner 7, the arm 16 is moved downward to open the gas valve 14. This places the arm 16 in position so that it may be engaged by the finger member 15 when the grid 6 and burner 7 are raised to remove them from the top of the stove.

I claim:

1. In a water heater, a grid having a sinuous chamber for containing water, water pipes for supplying water to the grid, a burner connected to the grid, the said grid pivotally supported on the said pipes, a gas valve for controlling the flow of the gas to the burner, a member for operating the gas valve, a finger member connected to the grid for operating the member to close the gas valve when the grid is pivotally moved on its supports in one direction only.

2. In a water heater, a grid having a sinuous chamber for containing water, water pipes for supplying water to the grid, a burner connected to the said grid and having gas burner outlets intermediate the spaces formed by the sinuous chamber, the said grid pivotally supported on the said pipes, a gas valve for controlling the flow of the gas to the burner, an arm connected to the gas valve for operating the gas valve, a finger member connected to the said grid for engaging the arm to close the gas valve when the grid burner is pivotally moved on its supports in one direction, the finger member adapted to slide along the arm as the valve is closed by turning the arm, the said finger member becoming disconnected from the end of the arm when the grid and burner have been moved a predetermined distance about the pivotal supports of the grid in the said direction, whereby the grid and burner may be returned without the finger member engaging the arm and opening the gas valve.

In witness whereof I have hereunto signed my name to this specification.

DAVID SLOTSKY.